May 26, 1970 P. J. COSTA ET AL 3,514,622
ACTUATOR CIRCUIT FOR A VEHICLE HORN
Filed April 29, 1968
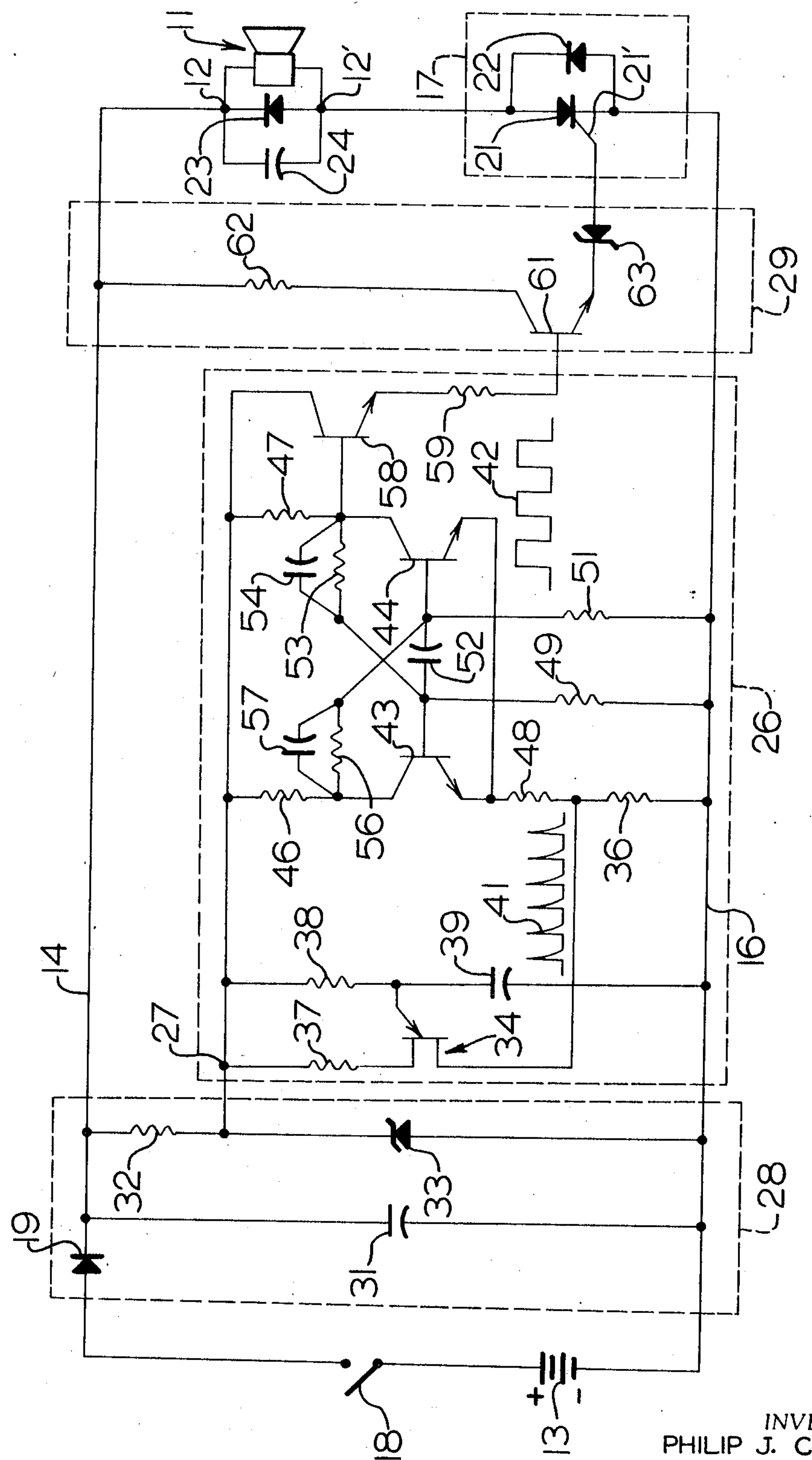
INVENTORS
PHILIP J. COSTA
WELDON L. PHELPS
BY
Fryer, Tjensvold, Feix, Phillips & Lempio
ATTORNEYS United States Patent Office 3,514,622

Patented May 26, 1970

3,514,622

ACTUATOR CIRCUIT FOR A VEHICLE HORN

Philip J. Costa, Chillicothe, and Weldon L. Phelps, Dunlap, Ill., assignors to Caterpillar Tractor Co., Peoria, Ill., a corporation of California Filed Apr. 29, 1968, Ser. No. 724,966

Int. Cl. B60g 5/00

U.S. Cl. 307—10 4 Claims

ABSTRACT OF THE DISCLOSURE

A horn of the type which sounds intermittently during certain vehicle operating conditions, such as when the vehicle is traveling in reverse, is provided with a highly reliable solid state actuator circuit comprised of a multivibrator beep timer with an input and output buffered against voltage fluctuations in the vehicle power supply to provide for extreme stability of the beep frequency.

BACKGROUND OF THE INVENTION

This invention relates to devices for producing an intermittent audible signal and more particularly to a solid state actuator circuit for a horn or the like of a vehicle.

Vehicle horns or other audible alarm devices are often arranged to cycle on and off at a rapid rate rather than emitting a continuous tone. The usual purpose of such horns is to alert nearby persons to the presence and movements of the vehicle and it has been found that the intermittent signal is more effective for this purpose. This is particularly true under conditions where there may be a high background noise level such as around tractors or earth-working vehicles. Accordingly, backup alarms, audible turn signals and related devices are usually arranged to sound intermittently at some predetermined beep frequency.

The horn is customarily operated by DC current from the vehicle battery and is of a construction which produces a continuous signal as long as uninterrupted current is applied to the horn terminals. To provide the desired intermittent signal, means must be connected between the horn and the battery to systematically open and close the circuit at the desired beep frequency during the period that the horn is actuated. Heretofore it has been the usual practice to use electro-mechanical means for this purpose. A common form of actuator is a motorized switch which is activated and driven by the DC current supplied to the horn and which operates to interrupt the current to the horn in a cyclical manner. There are several factors which make such actuator means less reliable and stable than is desirable.

A prominent problem is that such electro-mechanical actuator systems are inherently sensitive to fluctuations in the vehicle battery voltage. Transient voltage spikes and longer term voltage variations are almost inevitable in a vehicle battery circuit and are particularly pronounced in certain types of vehicles such as earthmoving apparatus. The practical effect of such voltage fluctuations on the horn is a very undesirable variation of the beep frequency. Still a further problem is that mechanisms having mechanical moving parts are not readily susceptible to being sealed against moisture or other deleterious environmental factors and may be affected by weather extremes.

SUMMARY OF THE INVENTION

The present invention is a solid state actuator circuit for a vehicle horn or the like which provides for an extremely stable beep frequency in the presence of battery voltage variations and which is readily susceptible to potting for complete protection against moisture and other adverse environmental influences. The invention utilizes a solid state timing circuit for intermittently sounding the horn together with buffering means which isolates the timing circuit from voltage fluctuations in the horn and power supply circuitry.

Accordingly it is an object of this invention to provide a reliable and durable vehicle horn system which sounds at a constant beep frequency in the presence of battery voltage variations of both short and long term duration and which is readily protected against moisture and other adverse environmental factors.

The invention, together with further objects and advantages thereof will best be understood by reference to the following description of a preferred embodiment taken in conjunction with the accompanying drawing.

BRIEF DESCRIPTION OF THE DRAWING

The accompanying drawing is a schematic circuit diagram of a representative embodiment of the invention as employed for actuating the backup alarm of an off highway truck.

DESCRIPTION OF A PREFERRED EMBODIMENT

Referring now to the drawing, the horn 11 associated with the present invention may be of the essentially conventional type which sounds at some predetermined audible primary frequency when a DC voltage is applied across the terminals 12 and 12' thereof. The power supply for actuating the horn is the vehicle battery 13 having, in this example, a positive B+ conductor 14 connected to horn terminal 12 and a negative B— conductor 16 connected to terminal 12' through a solid state switch 17 which will be hereinafter described in more detail. B+ conductor 14 connects to the battery 13 through a horn actuator switch 18 and a diode 19 which protects the circuit against inverted voltages. The actuator switch 18 may be controlled in any of various ways known to the art. Where, as in this example, the horn 11 is a backup alarm, the switch 18 may be arranged to be closed automatically by movement of the vehicle gear shift mechanism into the reverse settings thereof.

Thus upon closing of the actuator switch 18 actual sounding of the horn 11 is dependent upon the condition of the solid state switching circuit 17. Such circuit is comprised of an SCR (silicon controlled rectifier) 21 connected between horn terminal 12' and B— conductor 16 and having a control gate 21'. A diode 22 is connected in parallel with SCR 21 to protect the SCR from transient negative voltages.

To reduce the generation of negative voltage spikes in the power supply circuit by the horn 11, a diode 23 and parallel capacitor 24 are connected between the horn terminals 12 and 12'. The diode 23 is a short circuit to negative voltage impulses and the capacitor 24 aids in smoothing the horn terminal voltage.

To sound the horn 11 intermittently at a predetermined beep frequency while actuator switch 18 is closed, a timing circuit 26 controls the previously described SCR 21. To provide for stability of the beep frequency in the presence of voltage fluctuations in the B+ power supply conductor 14 the input terminal 27 of the timing circuit is coupled thereto through a filter and regulator circuit 28. The output of the timing circuit 26 is coupled to the gate 21' of SCR 21 through an impedance matching emitter follower circuit 29 which reduces loading and feedback on the timing circuit at the output thereof.

Filter and regulator circuit 28 may be comprised of a capacitor 31 connected between B+ and B− conductors 14 and 16, and a resistor 32 and Zener diode 33 also connected across the B+ and B− conductors and which are in series with each other. The input 27 of timing circuit 26 is connected to the junction between resistor 32 and Zener diode 33. Capacitor 31 and Zener diode 33 both serve as buffers between the timing circuit 26 and the power supply circuit. In particular, the capacitor 31 is effectively a short circuit to rapidly changing voltages and thereby acts to isolate the timing circuit from such transients. Zener diode 33 is selected to provide a constant input voltage to terminal 27 of the timing circuit which input voltage is substantially lower than the normal rated battery voltage which appears across B+ and B− conductors 14 and 16, respectively, when actuator switch 18 is closed. The constant voltage at terminal 27 as maintained by Zener diode 33 is selected to be below the range of non-transient variations of battery voltage which are normally encountered. In one example of the invention in which the vehicle battery 13 nominally provides twenty-four volts, when fully charged and under no-load conditions, resistor 32 and Zener diode 33 are arranged to provide for a sixteen volt input at the terminal 27 of the timing circuit.

Thus capacitor 31 buffers the timing circuit against brief voltage fluctuations while resistor 32 and Zener diode 33 protect the timing circuit from the effects of the longer term battery voltage variations which are normally present in a vehicle.

The timing circuit 26 in this example is a combined relaxation oscillator and hybrid multivibrator. The relaxation oscillator portion of the circuit may be comprised of a uni-junction transistor 34 having a first base connected to B− conductor 16 through a resistor 36 and having a second base connected to input terminal 27 through a resistor 37. The emitter of the uni-junction transistor 34 is connected to the junction between a resistor 38 and capacitor 39 which are connected in series between terminal 27 and B− conductor 16.

When the constant voltage is applied to the input terminal 27 by filter and regulator circuit 28 as hereinbefore described, a series of uniformly timed voltage spikes 41 appear across resistor 36 with the frequency of the spikes being determined by the applied voltage, the intrinsic stand-off ratio of the uni-junction transistor 34 and the RC time constant of the resistor 38 and capacitor 39 combination in the emitter circuit. It will be apparent that these characteristics may be selected to give any desired beep frequency, one and one-half on-off cycles per second (90 beeps per minute) being typical for a vehicle backup alarm.

The multivibrator section of the timing circuit 26 in effect acts to extend the narrow voltage spikes from uni-junction transistor 34, indicated by wave form 41, to a train of square wave pulses, as indicated by wave form 42, which have a duration and spacing corresponding to the desired duration and spacing of the successive beeps of the horn. For this purpose, first and second NPN transistors 43 and 44 each have a collector coupled to input terminal 27 through separate load resistors 46 and 47, respectively. The emitters of both transistors 43 and 44 are coupled together and connect with B− conductor 16 through a resistor 48 and the previously described resistor 36 across which the output pulses of uni-junction transistor 34 appear. The bases of transistors 43 and 44 are each coupled to B− conductor 16 through separate bias resistors 49 and 51, respectively, and are coupled together through a capacitor 52.

To provide the desired multivibrator action, the base of each transistor 43 and 44 is also coupled to the collector of the other transistor through a coupling network comprised of parallel resistance and capacitance. In particular, the base of transistor 43 is coupled to the collector of transistor 44 through a resistor 53 and parallel commutating capacitor 54 and the base of transistor 44 connects with the collector of transistor 43 through a resistor 56 and parallel capacitor 57. The output of the timing circuit 26 is defined by a third NPN transistor 58 having a base connected to the collector of transistor 44 and a collector connected to input terminal 27. An output resistor 59 connects the emitter of transistor 58 with impedance matching circuit 29.

The two transistors 43 and 44 and associated elements described above define a bistable system in which one transistor must be off when the other transistor is conducting since the output of each transistor is coupled to the input of the other. Further, the effect of the timing pulses 41 applied to the emitters of both transistors is to cause the circuit to alternate between its stable states. Thus if transistor 43 is conducting at a given moment, the coupling network defined by resistor 56 and capacitor 57 applies a relatively negative voltage to the base of transistor 44 maintaining transistor 44 in the off condition. The application of each timing pulse 41 to the emitters of the two transistors 43 and 44 then turns off the transistor which is on at that time. This causes a voltage rise at the base of the other transistor so that it becomes conductive. The subsequent timing pulse 41 initiates a reverse sequence of events to restore the first condition. Thus transistor 44 is alternately conducting and nonconducting at a rate determined by the timing pulses 41 and the alternations of the potential at the collector of transistor 44 are applied to the base of output transistor 58 to generate the square wave output 42 across resistor 59.

Impedance matching circuit 29 is an emitter follower comprised of a transistor 61 having a base coupled to the emitter of the output transistor 58 of the timing circuit 26 through the output resistor 59 thereof to receive the square wave output pulses 42. The collector of transistor 61 is connected to B+ conductor 14 through a load resistor 62 and the emitter connects to the gate 21' of the previously described SCR 21 through a Zener diode 63.

Thus transistor 61 is alternately switched on and off by the timing circuit 26 and applies a corresponding intermittent control signal to the gate of SCR 21 to actuate the horn 11 at the predetermined beep frequency. An SCR normally continues to conduct, once it has been gated on, after the gate signal is no longer present. It should be observed that this continued conduction does not occur for any significant length of time in the present circuit arrangement inasmuch as the types of horn 11 usually employed on vehicles inherently open their power supply circuit during each cycle of the primary horn tone frequency. Thus for practical purposes, SCR 21 remains conductive only during the application of the square wave pulses 42 to the gate thereof.

It should be noted that transistor 61 in the impedance matching circuit effectively isolates the output of timing circuit 26 from the power supply circuit. Specifically, positive voltage fluctuations in the power supply are blocked from the output of the timing circuit while negative voltage spikes would have to reduce the collector voltage of transistor 61 below the emitter voltage thereof before such fluctuations would be reflected into the timing circuit 26 at the output thereof.

Inasmuch as the above described circuitry uses solid state components, it may readily be potted in an epoxy compound or the like for protection from moisture, dust, detergents and other environmental factors which can affect electro-mechanical horn actuators.

While the invention has been described with reference to a specific example, it will be apparent that many modifications are possible within the scope of the invention and it is not intended to limit the invention except as defined in the following claims.

What is claimed is:

1. An actuator circuit for an audible alarm of the class carried on a vehicle and operated from an electrical power source thereon comprising:

an actuator switch having an open position and having a closed position for applying power from said source to said alarm;

a switching circuit of the class having an open position and a closed position as determined by the voltage applied to a gate of said switching circuit, said switching circuit being connected between said actuator switch and said alarm;

a timing circuit producing a sequence of pulses of predetermined frequency at an output in response to closing of said actuator switch; and means transmitting said pulses from said timing circuit output to said gate of said switching circuit whereby said alarm is alternately energized and de-energized while said actuator switch is closed, wherein said means transmitting pulses from said timing circuit output to said gate of said switching circuit is an impedance matching circuit which buffers said timing circuit output from external voltage fluctuations.

2. An actuator circuit as defined in claim 1 wherein said means transmitting pulses from said timing circuit output to said gate of said additional switching means is an emitter follower comprising a transistor having a base coupled to said timing circuit output, a load resistor connecting the collector of said transistor to said power source through said actuator switch, and a Zener diode coupling the emitter of said transistor to said gate of said additional switching means.

3. An actuator circuit for an audible alarm of the class carried on a vehicle and operated from an electrical power source thereon wherein said audible alarm is a horn of the class which cyclically interrupts the energizing current applied thereto comprising:

an actuator switch having an open position and having a closed position for applying power from said source to said alarm;

a switching circuit of the class having an open position and a closed position as determined by the voltage applied to a gate of said switching circuit, said switching circuit being connected between said actuator switch and said alarm;

a timing circuit producing a sequence of pulses of predetermined frequency at an output in response to closing of said actuator switch; and means transmitting said pulses from said timing circuit output to said gate of said switching circuit whereby said alarm is alternately energized and de-energized while said actuator switch is closed, wherein said switching circuit is comprised of a silicon controlled rectifier connected in series with said horn and said actuator switch and having a gate coupled to the output of said timing circuit through said pulse transmitting means.

4. An actuator circuit as defined in claim 3 wherein said timing circuit is comprised of a unijunction transistor relaxation oscillator driving a bi-stable multi-vibrator circuit which is coupled to said timing circuit output.

References Cited

UNITED STATES PATENTS

| | | | |
|---|---|---|---|
| 3,253,186 | 5/1966 | Rogers et al. | 307—293 X |
| 3,281,785 | 10/1966 | Oursler | 340—63 |
| 3,402,329 | 9/1968 | Stewart | 307—141 X |
| 3,421,107 | 1/1969 | Keller | 331—111 X |

ROBERT K. SCHAEFER, Primary Examiner

T. B. JOIKE, Assistant Examiner

U.S. Cl. X.R.

307—132, 141.4, 293; 331—111; 340—70